United States Patent
Burns et al.

(10) Patent No.: US 7,281,140 B2
(45) Date of Patent: Oct. 9, 2007

(54) DIGITAL THROTTLE FOR MULTIPLE OPERATING POINTS

(75) Inventors: James S. Burns, Los Altos, CA (US); Stefan Rusu, Sunnyvale, CA (US); David J. Ayers, Fremont, CA (US); Edward T. Grochowski, San Jose, CA (US); Marsha Eng, Sunnyvale, CA (US); Vivek Tiwari, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 10/041,092

(22) Filed: Dec. 28, 2001

(65) Prior Publication Data

US 2003/0126479 A1 Jul. 3, 2003

(51) Int. Cl.
G06F 1/04 (2006.01)
(52) U.S. Cl. ...................... 713/300; 713/323
(58) Field of Classification Search ........... 713/300, 713/323
See application file for complete search history.

(56) References Cited

U.S. PATENT DOCUMENTS

| | | | |
|---|---|---|---|
| 4,300,048 A | 11/1981 | Barbier et al. | |
| 4,551,031 A | 11/1985 | Ishikawa et al. | |
| 5,021,679 A | 6/1991 | Fairbanks et al. | |
| 5,046,858 A | 9/1991 | Tucker | |
| 5,153,535 A | 10/1992 | Fairbanks et al. | |
| 5,287,292 A | 2/1994 | Kenny et al. | |
| 5,307,003 A | 4/1994 | Fairbanks et al. | |
| 5,337,285 A * | 8/1994 | Ware et al. ............... | 365/227 |
| 5,373,254 A | 12/1994 | Nakauchi et al. | |
| 5,392,437 A | 2/1995 | Matter et al. | |
| 5,495,617 A | 2/1996 | Yamada | |
| 5,557,551 A | 9/1996 | Craft | |
| 5,604,546 A * | 2/1997 | Iwata ........................ | 348/699 |
| 5,627,412 A | 5/1997 | Beard | |
| 5,694,607 A * | 12/1997 | Dunstan et al. ............ | 713/340 |

(Continued)

FOREIGN PATENT DOCUMENTS

EP 0549165 A2 6/1993

(Continued)

OTHER PUBLICATIONS

U.S. Appl. No. 10/206,610, filed Jul. 26, 2002, "A VCC Adaptive Dynamically Variable Frequency Clock System for High Performance, Low Power Microprocessors," 48 pages including Figures.

(Continued)

*Primary Examiner*—Rehana Perveen
*Assistant Examiner*—Tse Chen
(74) *Attorney, Agent, or Firm*—Blakely, Sokoloff, Taylor & Zafman LLP (57) ABSTRACT

A processor includes a digital throttle to monitor the activity of various units of the processor's instruction execution pipeline. The monitored activity is scaled according to the current operating point of the processor and a power state is determined from the scaled activity. If the power state reaches a first threshold, the operating point of the processor is adjusted and a new scaling factor is selected to determine the power state.

26 Claims, 6 Drawing Sheets

U.S. PATENT DOCUMENTS

| | | | |
|---|---|---|---|
| 5,706,459 A * | 1/1998 | Atsushi | 712/200 |
| 5,719,800 A | 2/1998 | Mittal et al. | |
| 5,752,011 A | 5/1998 | Thomas et al. | |
| 5,766,228 A | 6/1998 | Bonnet et al. | |
| 5,778,237 A * | 7/1998 | Yamamoto et al. | 713/322 |
| 5,781,783 A | 7/1998 | Gunther et al. | |
| 5,815,724 A | 9/1998 | Mates | |
| 5,822,369 A | 10/1998 | Araki | |
| 5,832,284 A | 11/1998 | Michail et al. | |
| 5,835,885 A | 11/1998 | Lin | |
| 5,838,578 A | 11/1998 | Pippin | |
| 5,902,044 A | 5/1999 | Pricer et al. | |
| 5,963,596 A * | 10/1999 | Benbassat et al. | 375/243 |
| 5,964,881 A | 10/1999 | Thor | |
| 5,974,557 A | 10/1999 | Thomas et al. | |
| 5,996,059 A * | 11/1999 | Porten et al. | 712/200 |
| 6,009,128 A * | 12/1999 | Mobin et al. | 375/341 |
| 6,029,006 A | 2/2000 | Alexander et al. | |
| 6,078,356 A | 6/2000 | Jensen | |
| 6,088,807 A * | 7/2000 | Maher et al. | 713/324 |
| 6,091,255 A | 7/2000 | Godfrey | |
| 6,128,687 A * | 10/2000 | Dao et al. | 710/305 |
| 6,172,611 B1 | 1/2001 | Hussain et al. | |
| 6,192,479 B1 | 2/2001 | Ko | |
| 6,211,740 B1 | 4/2001 | Dai et al. | |
| 6,216,235 B1 | 4/2001 | Thomas et al. | |
| 6,219,796 B1 | 4/2001 | Bartley | |
| 6,351,760 B1 * | 2/2002 | Shankar et al. | 708/654 |
| 6,357,016 B1 * | 3/2002 | Rodgers et al. | 713/601 |
| 6,385,719 B1 * | 5/2002 | Derrick et al. | 712/235 |
| 6,393,374 B1 | 5/2002 | Rankin et al. | |
| 6,407,595 B1 * | 6/2002 | Huang et al. | 327/114 |
| 6,421,754 B1 * | 7/2002 | Kau et al. | 710/261 |
| 6,486,807 B2 * | 11/2002 | Jonsson | 341/120 |
| 6,487,668 B2 | 11/2002 | Thomas et al. | |
| 6,512,757 B1 * | 1/2003 | Niegel et al. | 370/342 |
| 6,557,116 B1 * | 4/2003 | Swoboda et al. | 714/28 |
| 6,559,631 B1 | 5/2003 | Balch et al. | |
| 6,625,634 B1 * | 9/2003 | Tremblay et al. | 708/700 |
| 6,636,976 B1 * | 10/2003 | Grochowski et al. | 713/320 |
| 6,651,176 B1 * | 11/2003 | Soltis et al. | 713/300 |
| 6,721,870 B1 * | 4/2004 | Yochai et al. | 711/204 |
| 6,751,741 B1 * | 6/2004 | Kawahara et al. | 713/320 |
| 2001/0021217 A1 | 9/2001 | Gunther et al. | |
| 2002/0062414 A1 * | 5/2002 | Hofmann et al. | 710/110 |
| 2002/0143488 A1 | 10/2002 | Cooper et al. | |
| 2003/0070013 A1 * | 4/2003 | Hansson | 710/59 |
| 2003/0110423 A1 * | 6/2003 | Helms et al. | 714/100 |
| 2003/0120904 A1 * | 6/2003 | Sudharsanan et al. | 712/223 |

FOREIGN PATENT DOCUMENTS

| | | |
|---|---|---|
| EP | 0592783 A2 | 4/1994 |
| WO | WO9917186 A1 | 4/1999 |

OTHER PUBLICATIONS

U.S. Appl. No. 09/471,795, filed Dec. 23, 1999, "Microprocessor with Digital Power Throttle," 31 pages including Figures.

U.S. Appl. No. 10/041,013, filed Dec. 28, 2001, "Multiple Mode Power Throttle Mechanism," 32 pages including Figures.

U.S. Appl. No. 10/227,125, filed Aug. 23, 2002, "An Apparatus for Thermal Management of Multiple Core Microprocessors," 21 pages including Figures.

U.S. Appl. No. 10/044,865, filed Oct. 22, 2001, "An Adaptive Variable Frequency Clock System for High Performance Low Power Microprocessors," 35 pages including Figures.

* cited by examiner

DIGITAL THROTTLE FOR MULTIPLE OPERATING POINTS

RELATED PATENT APPLICATIONS

This patent application is related to U.S. patent application Ser. No. 10/041,013, "Multiple Mode Digital Throttle Mechanism", filed on even date herewith and assigned to the same assignee.

BACKGROUND OF THE INVENTION

1. Technical Field

The present invention relates to microprocessors and, in particular, to mechanisms for controlling power consumption in microprocessors.

2. Background Art

Modern processors include extensive execution resources to support concurrent processing of multiple instructions. A processor typically includes one or more integer, floating point, branch, and memory execution units to implement integer, floating point, branch, and load/store instructions, respectively. Register files and on-chip caches are also provided to supply the execution resources with operands. When fully engaged by an executing program, these resources can create significant power dissipation problems.

Instruction code sequences that include enough instructions of the correct type to fully engage a processor's execution resources for significant intervals are relatively rare. Smart compilers and out of order execution can only extract so much instruction level parallelism (ILP) from most code. To conserve power, a processor may employ a clock gating mechanism to cut off the clock signal delivered to execution resources or their components that are not used by an executing code sequence. Such a processor can engage extensive resources as needed, e.g., to support code sequences with high ILP, without dissipating large amounts of power when code sequences with more typical ILP levels execute.

For code sequences having high ILP, few if any resources can be gated off, and the processor can dissipate significantly greater power than it does running code characterized by more typical ILP. To accommodate power-hungry code, a processor may be run at less than its top performance level by, for example, limiting its operating frequency. Hobbling the processor in this manner leaves a thermal margin for those code sequences that cause the processor to dissipate large amounts of power.

An alternative strategy, called power throttling, allows the processor to operate at its top performance level by default and reduces (throttles) the performance level if the processor's power consumption becomes too great. Power throttling may be implemented by, for example, temporarily reducing the number of instructions dispatched per clock cycle (instruction throughput), the frequency and/or the voltage at which the processor operates. This allows the processor to operate at its top performance levels for most code sequences. If a code sequence with extensive ILP runs, the processor reduces its performance level to maintain its power consumption within an established limit.

Regardless of how power consumption is controlled, effective power throttling requires a reliable mechanism for monitoring a processor's power consumption state. One currently available mechanism monitors the temperature of the processor's die to determine if throttling is required. An advantage of this approach is that it measures the consequence of excessive power consumption (die temperature) directly. A disadvantage is that changes in die temperature are slow relative to the time scale on which processors operate, e.g. on the order of seconds. This limits the speed with which high power consumption states can be detected and controlled. It also introduces analog circuitry into the predominantly digital environment of a processor, and if the voltage or frequency of operation is altered to address power consumption, the monitor circuitry may be affected.

The present invention addresses these and other problems associated with monitoring and controlling power consumption by processor and other programmable devices.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a mechanism for controlling the power dissipation of a processor under different operating regimes. An operating regime may be defined, for example, by the frequency of a clock signal employed by the processor, a voltage at which the processor's logic operates or a combination of frequency and voltage values.

In accordance with the present invention, a computer system includes a processor having a digital throttle. The digital throttle employs a weighted sum of activity states, scaled to reflect the current operating point of the processor, to estimate the power consumption of the processor. The digital throttle adjusts the processor's operating point if the estimated power consumption reaches a threshold value, and the scaling factor(s) is adjusted to reflect the new operating point.

For one embodiment of the invention, the digital throttle monitors the activity states of selected units of the processor's instruction pipeline in response to a sequence of instructions. The activity state of a unit indicates if the unit is gated on or off during a particular clock cycle. For each monitored unit, a weight representing, e.g., current or power consumed by the unit in its present activity state is provided. For example, a first weight may be provided if the unit is in a first activity state, and a second weight may be provided if the unit is in a second activity state. In effect, the digital throttle estimates power consumption of the processor through a weighted sum of activity states for the monitored units. This weighted sum is scaled for the current processor operating point and tracked over a specified interval to provide an estimate of the processor's power consumption level (power state). If warranted by the estimated power state, the digital throttle signals a change in the processor's operating point, and a scaling factor, appropriate for the new operating point, is selected.

Scaling factors representing a range of processor operating points may be tabulated and stored for use by the digital throttle. A scaling factor suitable for the current operating point of the processor is applied to the weighted sum. Alternatively, weights for each monitored unit may be scaled, responsive to a change in the processor's operating point. In addition, a threshold value used to assess the power consumption of the processor may also be scaled, responsive to a change in the processor's operating point.

The scaling factor(s) may be estimated or determined through a calibration process. For example, the digital throttle may be calibrated once as a part of the design process or it may be self-calibrating. In the latter case, the digital throttle may employ current monitoring circuitry and a calibration algorithm periodically to adjust the scale factor (s) at different operating points.

The disclosed mechanism thus relies on digital events (activity states) in the processor's logic to estimate a power consumption level for the current operating point of the processor. The operating point may be adjusted, responsive to the estimate power state, and the scaling factor(s) applied to assess the power consumption is adjusted appropriately. This provides a fast, direct, and deterministic mechanism for controlling a processors power consumption, and it does so without introducing analog circuitry into the processor.

Figure 1:
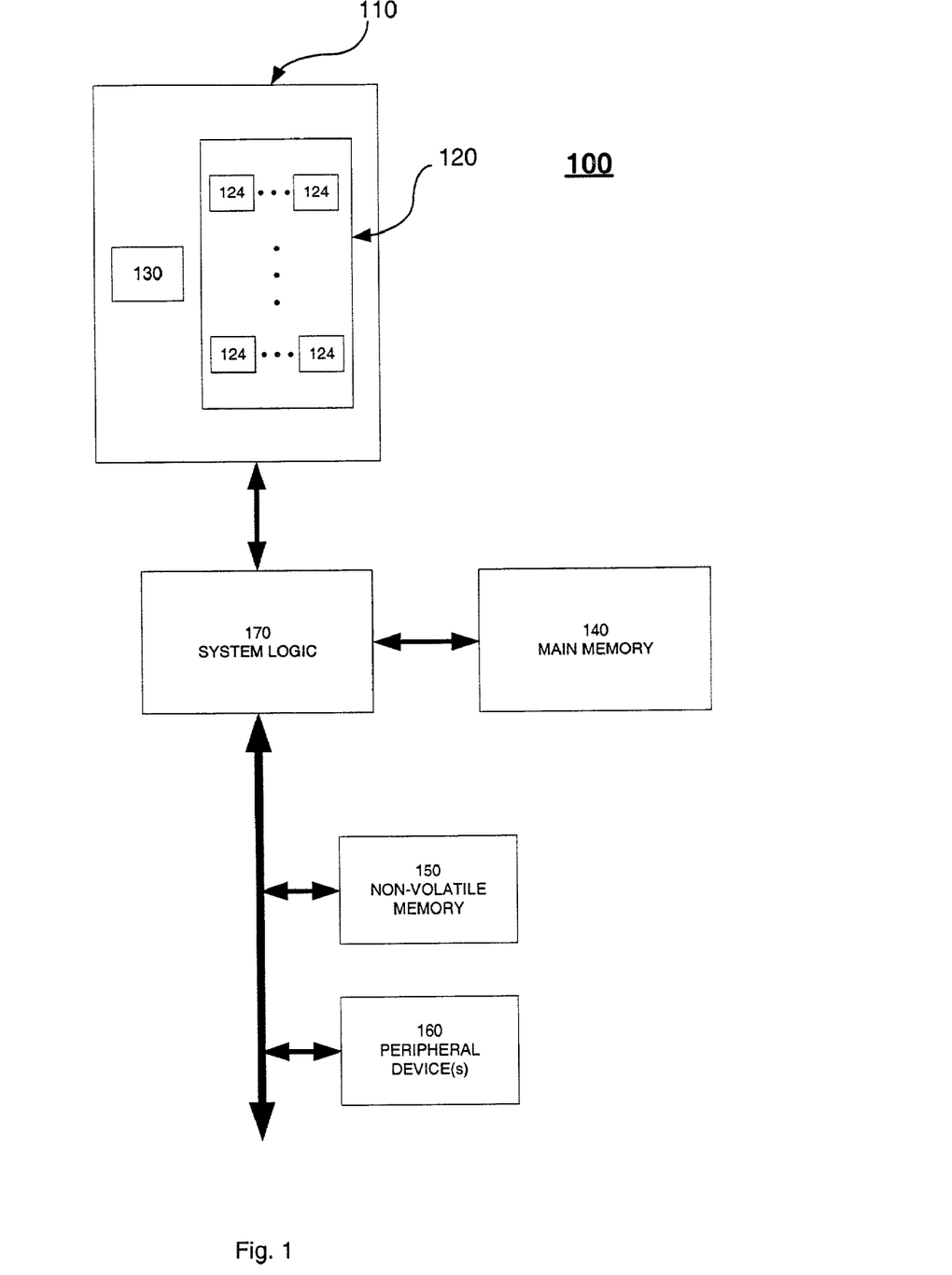
FIG. 1 is a block diagram of one embodiment of a computer system on which the present invention may be implemented.

FIG. 1 is a block diagram of one embodiment of a computer system 100 in which the present invention may be implemented. Computer system 100 includes one or more processors 110, a main memory 140, a non-volatile memory 150, various peripheral devices 160, and system logic 170. System logic 170 controls data transfers among processor(s) 110, main memory 140, non-volatile memory 150, and peripheral devices 160. A power delivery unit 180 is also shown. Computer system 100 is provided to illustrate various features of the present invention. The particular configuration shown is not necessary to implement the present invention.

Processor 110 includes multiple units 124, which form an instruction execution pipeline 120. Instructions are provided to processor 110 from main memory 140 and non-volatile memory 150. A digital throttle 130 monitors power consumption in the various units 124 in response to the processed instructions and adjusts operation of processor 110 accordingly.

As an instruction is staged down pipeline 120, it directs various units 124 to perform one or more operations that, taken together, implement the instruction. For example, a floating-point multiply-accumulate instruction (FMAC) may cause the following operations to occur in the indicated resources: a floating point register file reads out three operands; an FMAC execution unit multiplies two of the operands and adds the product to the third operation; an exception unit checks the product and sum for errors; and a retirement unit writes the result to the floating point register file if no errors are detected. Depending on the particular processor implementation, these resources or their components may be grouped into one or more units which are turned on and off as the instruction is staged down the pipeline. Each unit consumes a certain amount of current as it is activated by the instruction.

For one embodiment of the present invention, the current or power consumed by a unit 124 is represented by an associated weight or weights. When a unit is activated by an instruction, digital throttle 130 detects its active state and includes a first weight in a sum representing the activity, e.g. current or power consumption, of the processor on a given clock cycle. If the unit is not activated, digital throttle 130 may add a second weight to the sum. The second weight may be zero or a value representing current or power consumption of the unit in the inactive state. For one embodiment, the resulting weighted sum is scaled to reflect the processor's current operating point. For another embodiment, the individual weights may themselves be scaled. Digital throttle 130 implements these operations over a selected interval, generates a value representing an estimated power state for the processor, and adjusts the processor's operation if the value exceeds a specified threshold level.

Figure 2:
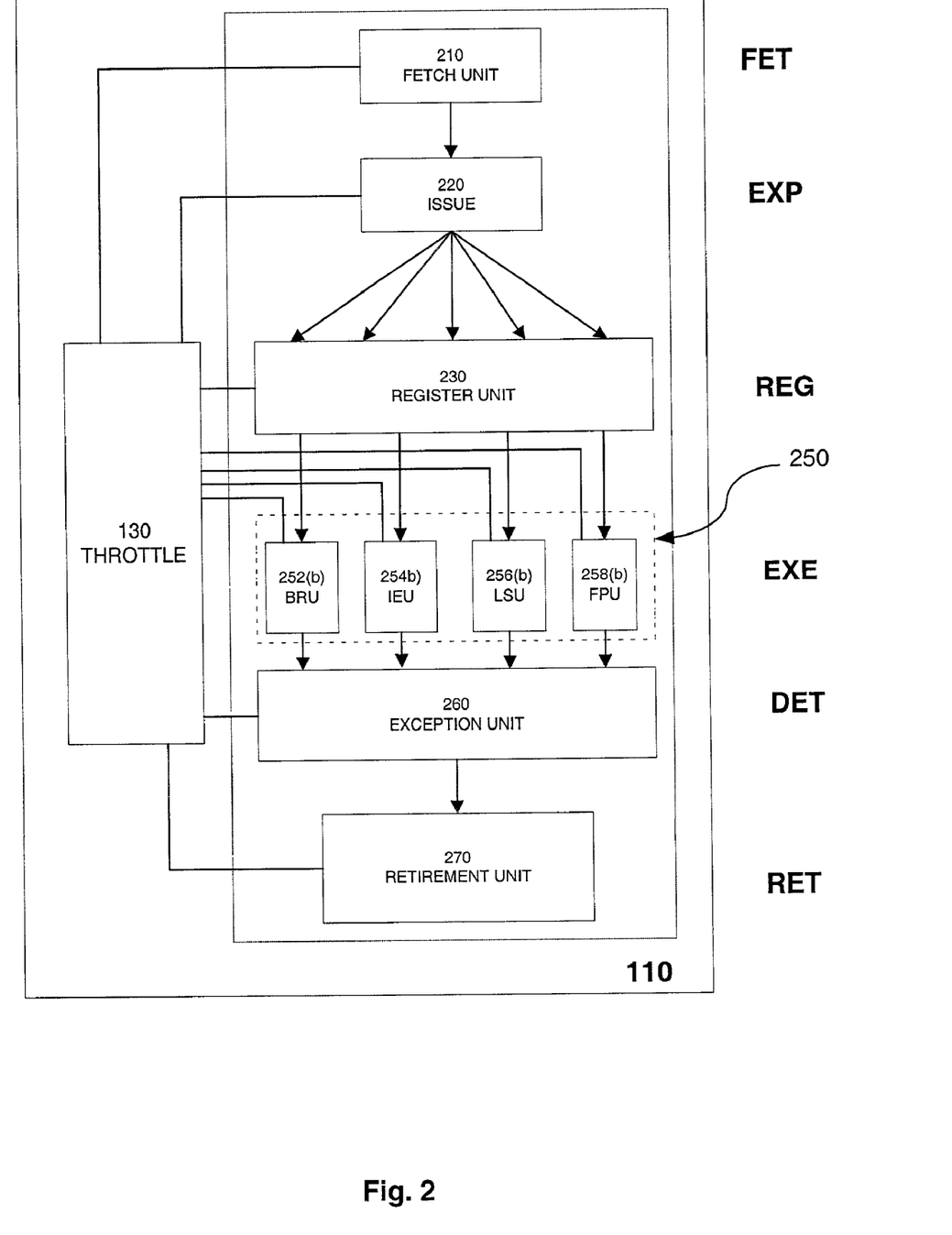
FIG. 2 is a block diagram of one embodiment of a processor that implements a digital power throttle in accordance with the present invention.

FIG. 2 represents in greater detail one embodiment of processor 110. For the disclosed embodiment of processor 110, pipeline 120 is represented as fetch (FET), expand (EXP), register (REG), execution (EXE), detect (DET), and retirement (RET) stages, respectively, and the execution resources corresponding to each stage are indicated. The present invention does not require partition of processor 110 into a particular set of pipeline stages. For example, a disclosed stage may be subdivided into two or more stages to address timing issues or facilitate higher processor clock speeds. Alternatively, two or more stages may be combined into a single stage. Other embodiments may include hardware for processing instructions out-of-order. The disclosed pipeline provides only one example of how operations may be partitioned in a processor implementing the present invention.

The front end of pipeline 120 includes fetch unit 210 and issue unit 220, which provide instructions to execution units in the back end of pipeline 120 for execution. Fetch unit 210 retrieves instructions from memory 140 directly or through a local cache (not shown) and provides the fetched instructions to issue unit 220. Issue unit 220 decodes the instructions and issues them to the execution resources in the back end of pipeline 120.

Throughout this discussion, the term "instruction" is used generally to refer to instructions, macro-instructions, instruction bundles or any of a number of other mechanisms used to encode processor operations. For example, the decode operation may transform a macro-instruction into one or more micro-operations (μops), resolve an instruction bundle into one or more instruction syllables, or retrieve a micro-code sequence associated with an instruction.

The back end of pipeline 120 includes register unit 230, execution unit 250, exception unit 260 and retirement unit 270. Register unit 230 includes a register rename unit and various register files (not shown) to identify the registers specified in the instructions and to accesses the data from the identified registers, respectively. Execution unit 250 includes one or more branch execution units (BRU) 252, integer execution units (IEU) 254, load/store units (LSU) 256, and floating point execution units (FPU) 258 to process branch, integer, load/store, and floating point instructions. Exception unit 260 checks the results generated by execution units 250 and adjusts the control flow if an exceptional condition is encountered. If no exceptional conditions are detected, retirement unit 270 updates the architectural state of processor 110 with the results.

The units activated by different instructions correspond to various combinations and subsets of the execution resources indicated for pipeline 120. For example, one unit may include a floating-point register (in register unit 230), and FPU 258 may have components in two or more units. In general, a unit includes various execution resources (register files, execution units, tracking logic) that are activated and deactivated together. The present invention does not depend on the detailed mapping between the units and the execution resources shown in FIG. 2.

Figure 3:
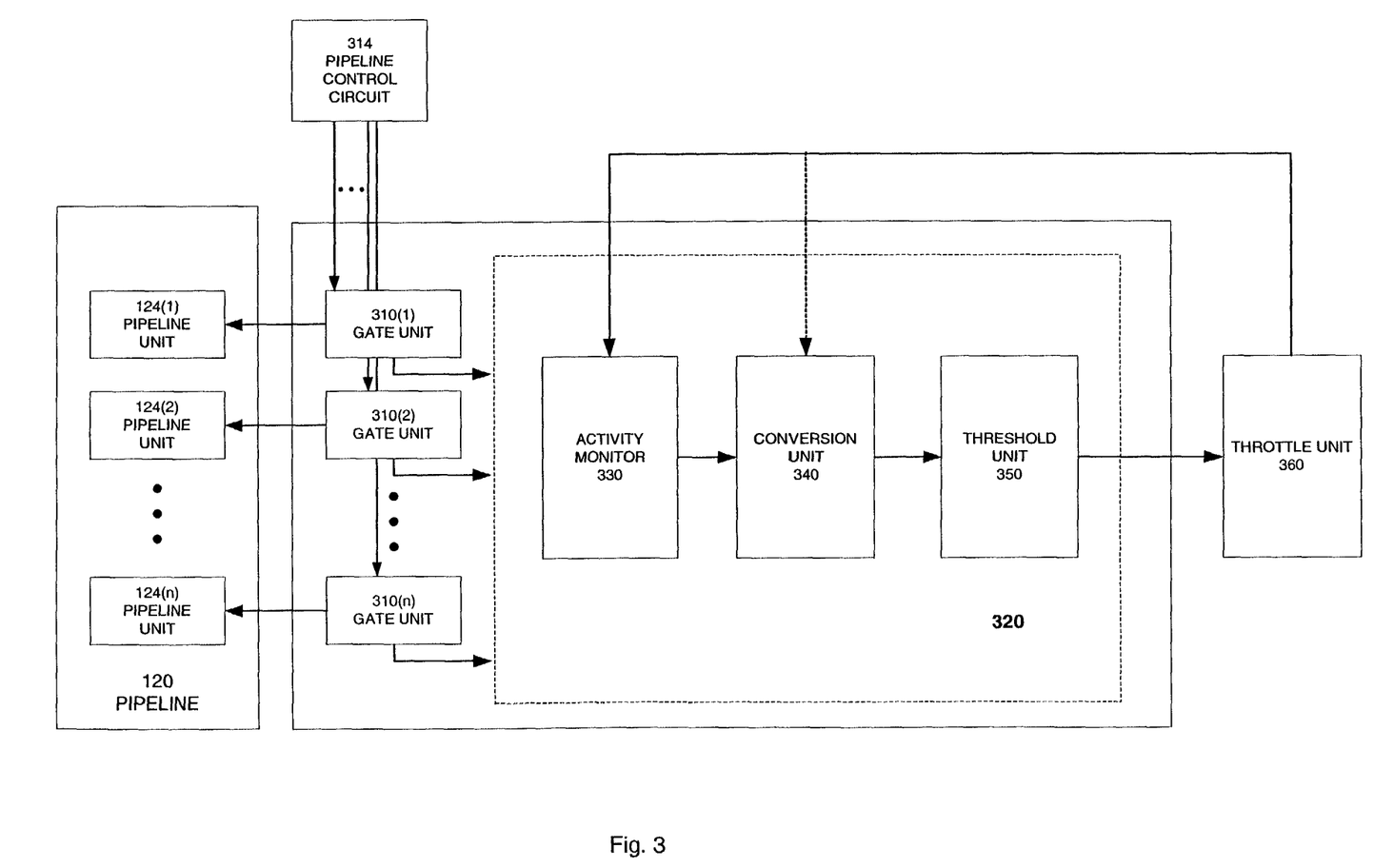
FIG. 3 is a block diagram of one embodiment of a digital power throttle implemented by the processor of FIG. 2.

FIG. 3 is a block diagram representing one embodiment of digital throttle 130 and its interactions with units 124 of pipeline 120. The disclosed embodiment of digital throttle 130 includes gate units 310(1)-310(n) (generically, gate unit 130), a monitor circuit 320, and a throttle circuit 350. Each gate unit 310 is associated with a unit 124 in pipeline 120 to monitor and/or control current delivery to the unit. For example, gate unit 310 may be a clock gating circuit that couples or decouples a clock signal to unit 124 according to whether or not the services of unit 124 are necessary to implement an instruction currently in the pipe stage in which the unit operates. Monitor circuit 320 collects signals from gate units 130 and assesses the current power state for processor 110 from the collected signals. Also shown in FIG. 3 is a pipeline control circuit 314, which indicates to gate units 310 which units are active for the currently executing instructions.

For the disclosed embodiment of digital throttle 130, each gate unit 310 provides a signal to monitor circuit 320 to indicate an activity state of its associated unit 124. For example, the signal may be asserted if unit 124 is turned "on", in which case, monitor circuit 320 adds a first weight to an estimate representing the per clock activity of processor 110. The first weight may represent the current or power provided to unit 124 when it is activated. For this embodiment, if unit 124 signal is not "on", the signal is deasserted, and monitor circuit 320 adds a second weight to the estimate. The second weight may represent the current or power provided to unit 124 when it is deactivated. The second weight may be zero, a value representing a leakage current in deactivated unit 124 or a similar value representative of its deactive state. A typical processor may include 10-20 gate units 310 to control power delivery to 10-20 units 124.

For the disclosed embodiment of digital throttle 130, monitor circuit 320 includes an activity monitor (AM) 330, a conversion unit (CU) 340, and a threshold unit (TU) 350. Also shown is a throttle unit 360 which adjust the operating point of a processor including digital throttle 130 if indicated by threshold unit 350.

AM 330 provides a clock by clock estimate of the processor's overall activity, based on the activity states of monitored units 124 and the current operating point of the processor. CU 340 accumulates per clock estimates and provides the accumulated value to TU 350 for comparison with a power threshold. For one embodiment of the invention, CU 340 may also be adjusted, responsive to a change in the operating point of the processor. TU 350 determines if the accumulated power value reaches a threshold value and signals a throttle unit to adjust the processor operation appropriately. For example, if the threshold value indicates a high power consumption state, throttle unit 360 may trigger the processor to enter a lower power consuming state. Lower power consumption states may be reached by reducing the instruction issue rate, reducing the frequency at which the processor operates, reducing the voltage at which the processor's logic operates or combinations of these and other power reduction mechanisms.

The power/current consumed by the processor's units depend the operating point of the processor. For example, at lower frequencies and/or voltages, a given unit consumes less power in its activated state than it does at higher frequencies and/or voltages. Accordingly, AM 330 adjusts its activity estimation to reflect changes in the operating state. For other embodiments of digital throttle 130, CU 340 may also adjust its computations to reflect changes in the processors operating state.

Figure 4A:
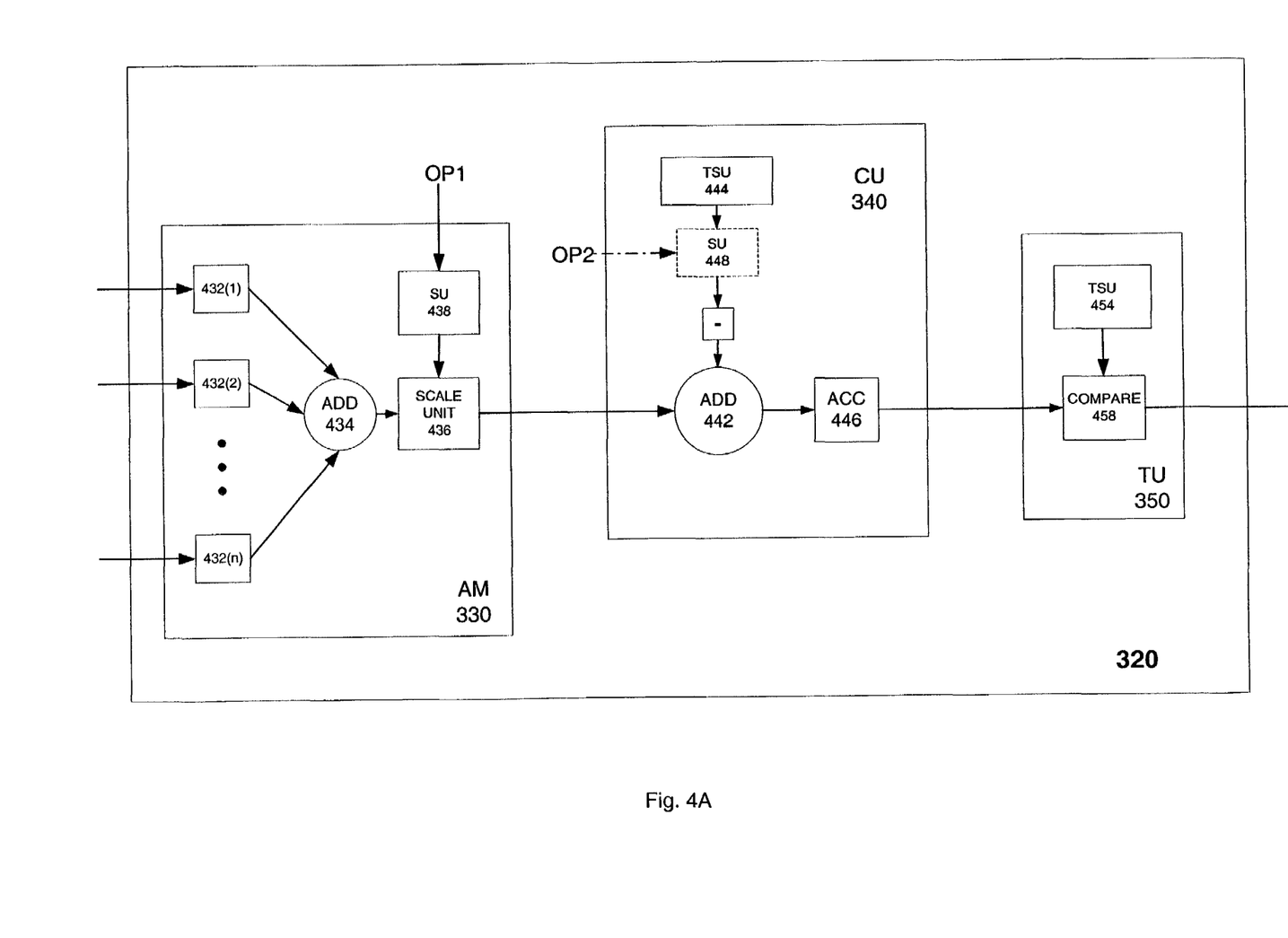
FIG. 4A is a block diagram of one embodiment of the monitor circuit of the digital power throttle of FIG. 3.

FIG. 4A shows in greater detail one embodiment of monitor circuit 320. For the disclosed embodiment of monitor circuit 320, AM 330 includes weight units 432(1)-432(n) (generically, weight units 432), an adder 434, a first scale unit 436, and a storage unit (SU) 438 for scale factors. Each weight unit 432 is associated with one of units 124 through a corresponding gate unit 310. Weight unit 432 provides a first weight to adder 434 if the activity state signal from its gate unit 310 is asserted, and a second weight if the activity state signal is not asserted.

For units that are not clock gated, AM 330 may include a weight representing the relative power or current these always-active units consume.

Adder 434 sums the weights indicated by weight units 134 and first scale unit 436 scales the sum to reflect the current operating point of the processor. For the disclosed embodiment of digital throttle 130, SU 438 stores scale factors appropriate for different operating points and provides the appropriate factor to scale unit 436. SU 438 may be implemented, for example, as a look-up table, cache or comparable data storage element. If an operating point input (OP1) indicates a change, SU 438 provides a new scale factor to scale unit 436.

For the disclosed embodiment of monitor circuit 320, CU 340 includes an adder 442, threshold storage unit 444, and an accumulator 446. A value in storage unit 444 may represent, for example, a current or power threshold. The threshold value is negated and provided to an input of adder 444, the second input of which is coupled to the output of scale unit 435. The difference is added to a value in accumulator 446, which effectively integrates the per cycle activity relative to the threshold value. For example, the overall activity may be scaled represent an estimate of the per cycle power consumption of the processor and the first threshold value may be a specified average power. The value in accumulator 446 may then represent a thermal excess or deficit, relative to a temperature associated with the average power state.

Other embodiments of CU 340 may include circuitry to forward the value in accumulator 446 to threshold unit 350 at a specified sampling frequency. The sampling period allows digital throttle 130 to moderate the impact of power consumption spikes. Other embodiments of digital throttle 130 may use the output of adder 444 to control throttle unit 360 directly, e.g. on a clock by clock basis.

Also shown in FIG. 4A is a second, optional scaling unit 448 to apply a selected scale factor to the threshold value stored in threshold storage unit 444. Scaling unit 448 allows the value in threshold storage unit 444 to be scaled, responsive to changes in the processor's operating point, indicated by OP2. Persons skilled in the art will recognize that adjustment of the threshold value may be implemented in other ways as well. For example, another embodiment of CU 340 may store multiple threshold values and select a threshold value responsive to the operating point data indicated by OP2.

For the disclosed embodiment of monitor circuit 320, the value tracked by accumulator 446 (accumulated power consumption) is provided to TU 350 for comparison with a second threshold value. The disclosed embodiment of TU 350 includes a storage 454 and a comparator 458. As noted above, the value in accumulator 446 may be provided on each clock cycle or following a specified sampling period. Storage 454 stores a value representing the second threshold level against which the accumulated power consumption is compared. For the example described above, the second threshold may represent upper and lower temperature thresholds that trigger power reducing and power increasing mechanisms, respectively, if reached.

If the accumulated activity reaches the second threshold, TU 350 provides a signal to throttle unit 360, which triggers an appropriate adjustment to the power consumption level of processor 110. As noted above, the adjustment may be accomplished by issuing fewer (more) instructions per clock cycle, reducing (increasing) the clock frequency at which the processor operates, reducing (increasing) the voltage at which it operates, or some combination of these strategies or other power reduction (increasing) strategies. To the extent any of these changes affect the weighting appropriate for monitored units 124, new scale factor(s) are selected for use by digital throttle 130.

Figure 4B:
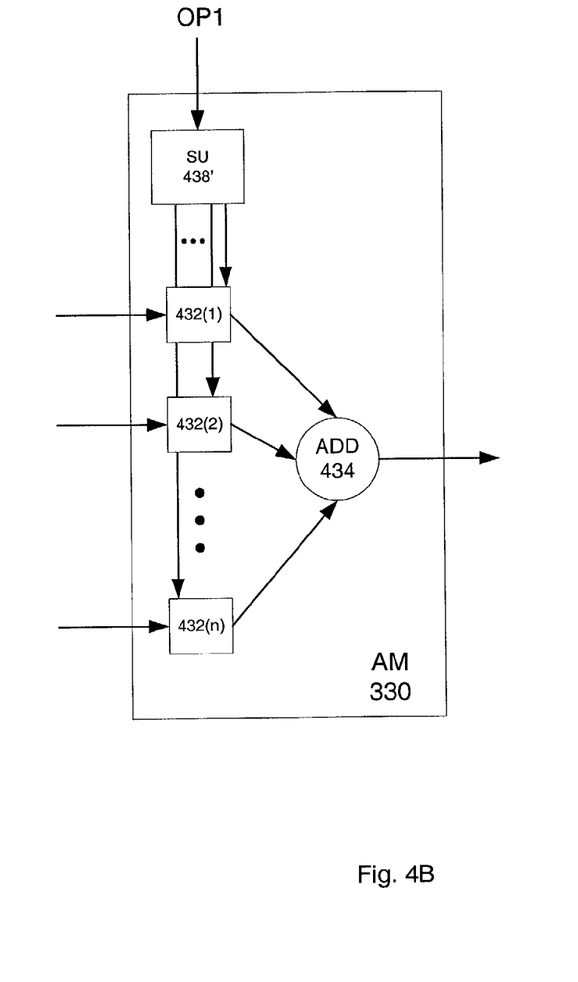
FIG. 4B is a block diagram of an alternative embodiment of the scalable current computation unit of FIG. 4A.

FIG. 4B is a block diagram showing another embodiment of AM 330 (AM 330'). For the disclosed embodiment, SU 438 adjusts the values of weight units 432, responsive to a change in the operating point of the processor.

Figure 5:
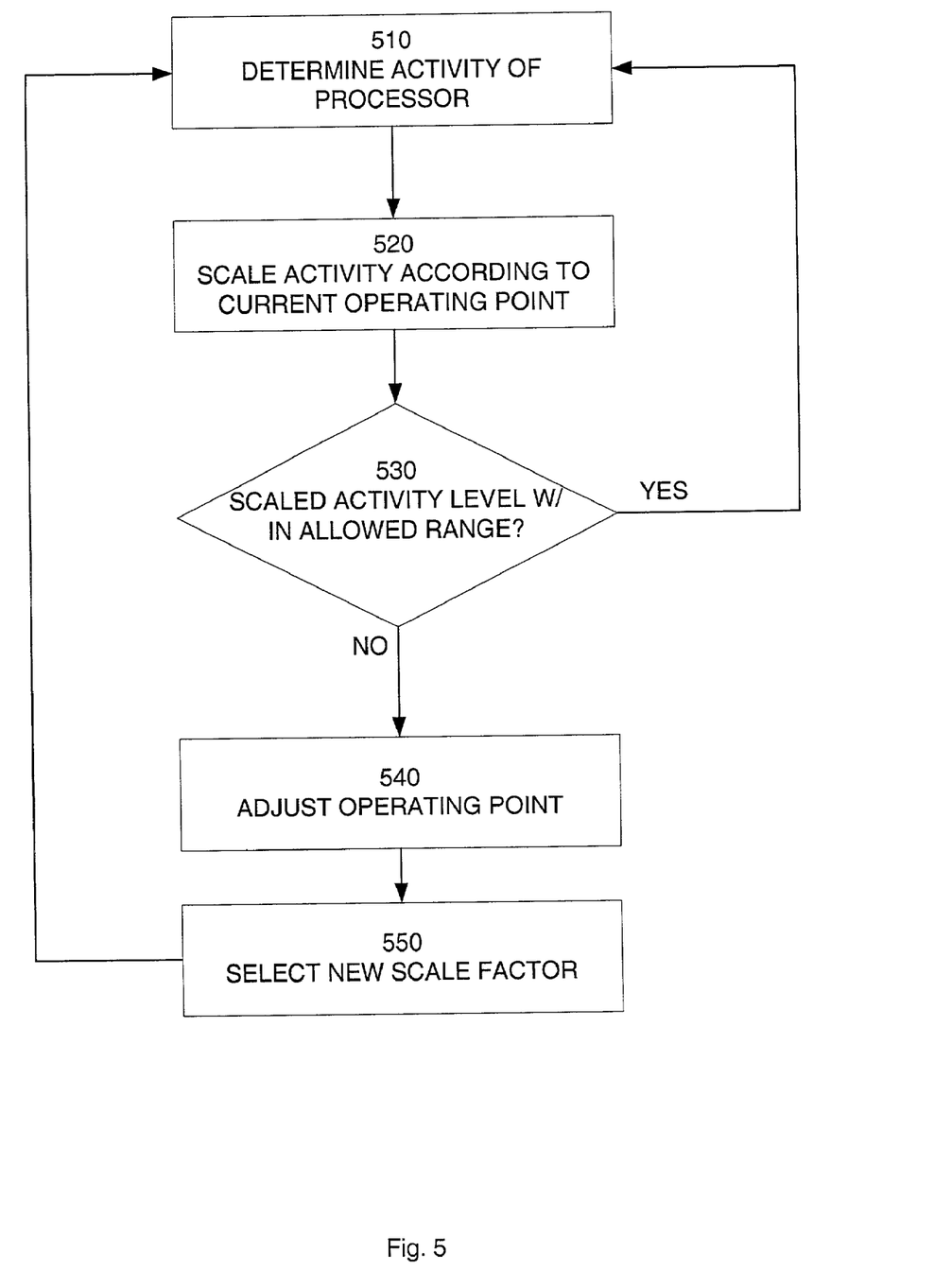
FIG. 5 is flowchart representing a method in accordance with the present invention for adjusting the power consumption of a processor.

FIG. 5 is a flowchart representing a method 500 in accordance with the present invention for controlling power consumption in a processor. Method 500 estimates 510 the activity of the processor, based on active/inactive states of its component units. The estimated activity is then scaled 520 according to the current operating point of the processor to provide an indication of the processor's power state. The scaled activity is compared 530 with a threshold. If the comparison 530 indicates the processor is operating outside a specified regime, the processor's operating point is adjusted 540 and a scale factor appropriate for the new operating point is selected 550. If the comparison indicates the processor is operating within the specified regime, method 500 continues with the current scale factors. For embodiments of method 500, the scaled activity may be tracked or integrated over time prior to comparison, to mitigate the impact of power spikes.

As noted above, different mechanisms may be employed to adjust the power state of a processor, responsive to an indication from the processor's digital throttle that the processor is operating outside a specified regime. For example, power consumption changes in a substantially linear manner with changes in the processor's instruction throughput. One mechanism for adjusting instruction throughput introduces "bubbles", e.g., empty instruction slots, in the normal flow of instructions or otherwise reduces the number of instructions dispatched per clock cycle. This may be accomplished by injecting No-Operations (NOPs) into the instruction flow at a particular rate. The higher the ratio of No-Operations to useful, e.g. power-consuming, instructions, the lower the power consumption state of the processor is. U.S. patent application Ser. No. 09/471,795 describes mechanisms for adjusting instruction throughput using a digital throttle.

Linear power reduction mechanisms, such as reducing instruction throughput, can be implemented with relatively low latencies, e.g. on the order of a couple of clock cycles. However, their ability to reduce power may not be sufficient to address a power state detected by digital throttle 130. Adjusting the processor's operating frequency, its operating voltage, or some combination of the frequency and operating voltage has a greater impact on power consumption. The operating point of a processor may be altered by, for example, reducing the clock frequency (v) and/or the voltage (V) at which the processor operates. The frequency at which a processor can operate scales linearly with V, due to the lower transistor gate drive available at lower voltages, and power dissipation scales with the square of the voltage ($V^2$). Reducing the frequency and voltage together thus reduces the power consumption at a rate that scales as $V^3$. Power throttling by scaling v and V can be very effective, but changing the operating point of the processor is a relatively slow process.

A digital throttle may be used to adjust instruction throughput first, if a monitored activity indicates the approach of a high power state. Since this power reduction strategy does not alter the current or power estimates based on processor activity, no adjustment of the scale factor is necessary. If a reduction in instruction throughput does not reduce power consumption significantly, or if throughput reduction is triggered too frequently, the digital throttle switches to voltage and frequency-based mechanisms to control power consumption. Voltage-based strategies alter the processor's operating point, which in turn alters the mapping between activity states and power consumption. The scale factor(s) is adjusted responsive to a change in the operating point.

There has thus been provided a digital throttle that monitors the activity of a processor and scales the monitored activity according to the processor's current operating point to estimate its power consumption. If the estimated power consumption falls outside a specified range, the processors operating point is adjusted, a scaling appropriate for the new operating point is selected, and monitoring proceeds at the new operating point.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A system comprising:
    an execution pipeline;
    a power delivery unit to provide power to the execution pipeline at a specified operating point, wherein the power delivery unit includes a clock gating circuit to control power delivery to one or more units of the execution pipeline, the clock gating circuit including a plurality of gating units that each control a clock signal to an associated unit in the execution pipeline and provide a signal indicative of the activity state of the associated unit that is being monitored for power consumption;
    a digital throttle to estimate a power state, responsive to activity of the execution pipeline and the specified operating point, and to trigger a change in the operating point, responsive to the estimated power state reaching a first threshold, wherein the digital throttle comprises an activity monitor to estimate an activity level responsive to a signal from the clock gating circuit, the activity monitor including a scaling unit to scale the estimated activity level according to a current operating point.

2. The system of claim 1, wherein the scaling unit includes:
a look-up table to store scaling factors for a plurality of operating points; and
a multiplier to multiply the estimated activity level by the scaling factor associated with the current operating point.

3. The system of claim 1, wherein the monitor unit further comprises:
a plurality of weight units, each weight unit being associated with one of the units of the execution pipeline; and
an adder to receive a first or second value from each weight unit, responsive to the signal from the clock gating circuit.

4. The system of claim 1, wherein the activity monitor includes:
a look-up table to store scaling factors corresponding to a plurality of operating points; and
a scaling unit to adjust the activity level according to a scaling factor appropriate for the specified operating point.

5. The system of claim 4, further comprising a conversion circuit to determine a power state from the adjusted activity level.

6. A system comprising:
an execution pipeline;
a power delivery unit to provide power to the execution pipeline at a specified operating point, wherein the power delivery unit includes a clock gating circuit to control power delivery to one or more units of the execution pipeline, the clock gating circuit including a plurality of gating units that each control a clock signal to an associated unit in the execution pipeline and provide a signal indicative of the activity state of the associated unit that is being monitored for power consumption:
a digital throffle to estimate a power state, responsive to activity of the execution pipeline and the specified operating point, and to trigger a change in the operating point, responsive to the estimated power state reaching a first threshold, wherein the digital throttle comprises an activity monitor to estimate an activity level responsive to a signal from the clock gating circuit, the activity monitor including a scaling unit to adjust the estimated activity level responsive to the current operating point, wherein the activity monitor includes a look-up table to store scaling factors corresponding to a plurality of operating points; and a scaling unit to adjust the activity level according to a scaling factor appropriate for the specified operating point: wherein the system further includes a conversion circuit to determine a power state from the adjusted activity level, wherein the conversion circuit compares the adjusted activity level with a threshold level and stores the difference in an accumulator.

7. The system of claim 6, wherein the conversion unit scales the threshold level responsive to the current operating point.

8. A processor comprising:
an execution pipeline;
a clock gating circuit to control power delivery to one or more units of the execution pipeline, including the clock gating circuit including a plurality of gating units that each control a clock signal to an associated unit in the execution pipeline and provide a signal indicative of the activity state df the associated unit that is being monitored for power consumption;
a monitor unit to estimate an activity level of the execution pipeline, responsive to signals from the gating units of the clock gating circuit;
a scaling unit to scale the estimated activity level according to a current operating point of the processor; and
a threshold comparator to determine if the scaled, estimated activity level meets a first threshold level.

9. The processor of claim 8, wherein the scaling unit includes a look-up table and a multiplier, the look-up table to provide a scale factor to the multiplier, responsive to the operating point of the processor.

10. The processor of claim 9, wherein the operating point of the processor is specified by a voltage and a frequency.

11. A processor comprising:
an execution pipeline:
a clock gating circuit to control power delivery to one or more units of the execution pipeline, including the clock gating circuit including a plurality of gating units that each control a clock signal to an associated unit in the execution pipeline and provide a signal indicative of the activity state of the associated unit that is being monitored for power consumption;
a monitor unit to estimate an activity level of the execution pipeline, responsive to signals from the gating units of the clock gating circuit;
a scaling unit to adjust the estimated activity level responsive to an operating point of the processor; and
a threshold comparator to determine if the scaled, estimated activity level meets a first threshold level, wherein the further comprising an accumulator to increment a stored value by a difference between the scaled, estimated activity and the first threshold if the scaled activity exceeds the first threshold.

12. The processor of claim 11, further comprising a comparator to compare the stored value with a second threshold and to assert a power-reduction signal if the stored value reaches the second threshold value.

13. The processor of claim 8, wherein the activity monitor includes an adder having one or more weighted inputs, each input associated with the one or more pipeline units, respectively.

14. The processor of claim 13, wherein the status signal comprises one or more status signals associated with the one or more pipeline units, respectively.

15. The processor of claim 14, wherein the adder sums a first or a second value from each of the weighted inputs, responsive to a state of the associated status signal.

16. A method for controlling power consumption in a processor comprising:
monitoring activity states for pipeline units of the processor using signals from individual gating units that are each associated with a pipeline unit that has its power consumption level being monitored, wherein each gate unit controls a clock signal to activate its associated pipeline unit as it is needed;
estimating a power state for the processor using the monitored activity states and a current operating point of the processor that includes estimating an activity level from the monitored activity states, and scaling the estimated activity level according to the current operating point;
comparing the estimated power state with a threshold value; and adjusting the operating point of the processor if the estimated power state exceeds the threshold value.

17. The method of claim 16, wherein the estimating the power state comprises:
   normalizing the scaled activity level relative to a first threshold; and
   accumulating the normalized, scaled activity level for a series of clock intervals.

18. The method of claim 16, wherein monitoring activity states comprises monitoring status signals provided by gate units associated with the pipeline units of the processor.

19. The method of claim 16, wherein adjusting the operating point of the processor comprises adjusting a frequency of the clock signal.

20. The method of claim 19, wherein adjusting the operating point further comprises adjusting a voltage of the clock signal.

21. The method of claim 16, wherein estimating the activity level comprises:
   adding a first or a second weight value to a sum, responsive to a pipeline unit being in a first or a second activity state, respectively; and
   scaling the sum by a factor associated with the current operating point.

22. The method of claim 12, wherein estimating the activity level further comprises adding a weight to the sum to represent pipeline units that operate in a single activity state.

23. A computer system comprising:
   a memory system to store instructions for execution;
   an instruction execution pipeline including a plurality of units to execute the instructions;
   a power delivery system to deliver power to the execution pipeline at a current operating point, the power delivery system includes plural gate units to control power delivery to one or more units of the execution pipeline and to provide signals indicative of the activity state of associated units of the execution pipeline that are having their power consumption level monitored;
   an activity monitor to estimate an activity level for the execution pipeline at the current operating point using signals from the plural gate units, and to scale the estimated activity level to the current operating point; and
   a throttle circuit to adjust the current operating point, responsive to a power state determined from the scaled estimated activity level falling outside a specified range.

24. The computer system of claim 23, wherein each gate unit indicates a first or second activity state for a unit of the execution pipeline, according to the unit's being active or inactive in a clock interval.

25. The computer system of claim 24, wherein activity monitor includes an adder to add a first or a second weight to the activity level, responsive to the gate unit indicating a first or second state for its associated pipeline unit in the clock interval.

26. The system of claim 25, wherein the activity monitor further includes a scale unit to scale the activity level for the clock interval according to the current operating point of the processor.

* * * * *

UNITED STATES PATENT AND TRADEMARK OFFICE
CERTIFICATE OF CORRECTION

PATENT NO. : 7,281,140 B2
APPLICATION NO. : 10/041092
DATED : October 9, 2007
INVENTOR(S) : Burns et al.

It is certified that error appears in the above-identified patent and that said Letters Patent is hereby corrected as shown below:

In column 9, at line 38, delete "signa1" and insert --signal--.
In column 9, at line 40, delete "consumption:" and insert --consumption;--.
In column 9, at line 54, delete "point:" and insert --point;--.
In column 10, at line 19, delete "pipeline:" and insert --pipeline;--.
In column 10, at line 34, after "the" insert --processor--.
In column 11, at line 25, delete "12" and insert --21--.

Signed and Sealed this

Fifteenth Day of April, 2008

JON W. DUDAS
*Director of the United States Patent and Trademark Office*